United States Patent [19]
Walker et al.

[11] Patent Number: 5,943,735
[45] Date of Patent: Aug. 31, 1999

[54] SHOPPING TROLLEY, A CASTOR FOR A SHOPPING TROLLEY AND A KIT OF PARTS FOR FITTING TO SUCH A CASTOR

[75] Inventors: Phillip Stuart Walker; Doris Jessie Walker; Stuart Charles Walker, all of Slough, United Kingdom

[73] Assignee: Flexello Limited, Slough, United Kingdom

[21] Appl. No.: 08/875,011

[22] PCT Filed: Jan. 16, 1996

[86] PCT No.: PCT/GB96/00079

§ 371 Date: Jul. 16, 1997

§ 102(e) Date: Jul. 16, 1997

[87] PCT Pub. No.: WO96/22191

PCT Pub. Date: Jul. 25, 1996

[30] Foreign Application Priority Data

Jan. 16, 1995 [GB] United Kingdom ............... 9500797
Oct. 26, 1995 [GB] United Kingdom ............... 9521962

[51] Int. Cl.$^6$ .................................................. B60B 33/00
[52] U.S. Cl. ............................................... 16/38; 16/35 D
[58] Field of Search ............................ 16/38, 35 D, 35 R, 16/37, 39, 31 A, 31 R, 43, 44, 280, 281, 309

[56] References Cited

U.S. PATENT DOCUMENTS

| 4,212,093 | 7/1980 | Lombard | 16/35 D |
| 4,399,587 | 8/1983 | Penifaure | 16/35 D |
| 5,727,285 | 3/1998 | Goman | 16/38 |

*Primary Examiner*—Chuck Y. Mah
*Attorney, Agent, or Firm*—Clifford W. Browning; Woodard, Emhardt, Naughton, Moriarty & McNett

[57] ABSTRACT

A steering assistance device for a castor comprises a cam portion (39) having a lobe (41) which is fixed to the bottom of the fixing bolt of the castor and which is surrounded by a closed portion (43) of a capture device (42). The lobe (41) is engaged in an arcuate recess (49) of the capture device (42) in the dead center position of the castor. The capture device (42) is formed of a plastics material and its sides and ends are resilient slats. The arcuate recess (49) is in one end and the two sides (50 and 52) carry inwardly projecting arms (51 and 53). Steering assistance is provided by resistance to angular displacement of the capture device (42) around the cam portion (39) which is provided by the resilience of the capture device (42), first progressively increasing to a maximum whilst the lobe (41) is engaged in the recess, secondly maintaining that maximum as it passes out of the recess (49), across a projection (58, 59) into engagement with one of the arms (51 and 53), and thirdly gradually reducing until it is released from the arm (51 or 53). The remainder of the swiveling movement is without resistance as there is a clearance around the cam portion (39).

7 Claims, 4 Drawing Sheets

# SHOPPING TROLLEY, A CASTOR FOR A SHOPPING TROLLEY AND A KIT OF PARTS FOR FITTING TO SUCH A CASTOR

This invention relates to a shopping trolley, a castor for a shopping trolley and to a kit of parts for fitting to such a castor.

Shopping trolleys are well known for being difficult to steer. If either or both the castors at the rear of the trolley is or are provided with a device operable to provide steering assistance which comprises spring loading means operable to allow swivelling of the castor when it is not in line but which acts when the castor comes into line to resist swivelling out of line and which comprises a spring which acts continuously on a cam, the spring will be continuously under load which is undesirable and there will always be some friction in the system even when free swivelling is required. CH-A-607958, U.S. Pat. No. 4,246,677, U.S. Pat. No. 4,280,246, FR-A-2488190 and DE-A-3136203 disclose various forms of steering aids for castors which comprise some such form of continuously loaded spring arrangement.

An object of this invention is to provide an aid to steering a shopping trolley which is automatically operable in that it does not require any operating function by the shopper, which is capable of being fitted to existing castors without a need to modify the structure of the castor itself, and which does not suffer from the disadvantages referred to above.

According to one aspect of this invention there is provided a castor for a shopping trolley, comprising a swivel body, a fixing component by which the castor is to be fixed to the respective leg of the shopping trolley, and means operable to resist angular displacement of the swivel body relative to the fixed component from a substantially dead centre position, the means comprising a spring-loaded capture device which comprises means carried by the swivel body which define a capture recess and cam means mounted on the fixing component, the spring-loaded capture device being operable to capture the cam means in the capture recess in the substantially dead centre position, wherein the castor is for a rear wheel of the shopping trolley and the cam means comprise a cam having a lobe the spring-loaded capture device being operable to capture the lobe, in the recess in the substantially dead centre position, the spring loading being operable to allow engagement and disengagement of the lobe from the recess at either end of a limited range of angular movement which extends on either side of the dead centre position and to resist angular movement of the capture device relative to the cam when the lobe is engaged within the recess, there being a substantially friction free clearance around the cam and its lobe for a substantial part of the range of swivelling movement of the swivel body relative to the fixing component when the lobe is disengaged from the recess and the spring of the spring-loaded capture device is relaxed so that the swivel body is free for substantially friction free swivelling movement relative to the fixing component for the substantial part of its full range of swivelling movement.

Preferably the spring-loaded capture device is provided with at least two resiliently deflectable side members formed outwith the recess, each of said side members being adapted such that the lobe can engage therewith, so that when the lobe is so engaged with one of the side members, the angular movement of the capture device is resiliently resisted, the spring-loading being such that it is operable to allow engagement or disengagement of the lobe from the side member, the arrangement being such that the swivel body is free for substantially friction free swivelling movement relative to the fixing component when the lobe is disengaged from both the recess and the side members.

Preferably the capture device comprises a closed generally rectangular figure which extends around the cam, each side of the closed generally rectangular figure comprising a resilient slat, a respective one of which has an arcuate portion which forms the recess, with the resilient side members being placed on the sides adjacent said respective one and symmetrically about the recess, and the spring loading of the device being the resilience of the slats.

The capture device may be loosely supported on the swivel body against which it reacts when the lobe is captured in the recess. The capture device may have projections which are a sliding fit between cooperating locating surfaces formed on the swivel body whereby the capture device is located against angular movement relative to the body.

According to another aspect of this invention there is provided a shopping trolley having front and rear wheels on castors, wherein the castor of at least one of the rear wheels comprises a castor according to said one aspect of this invention, the cam and the spring-loaded capture device being fitted to the castor so that the lobe is engaged within the recess when the respective rear wheel is in line and trailing with respect to the body of the castor.

According to a further aspect of this invention there is provided a kit of parts comprising the spring-loaded capture device and the cam of a castor according to said one aspect of this invention for fitting to a castor of a shopping trolley.

A shopping trolley fitted with one form of castor in which this invention is embodied, and a modification for another form of castor are described now by way of example with reference to the accompanying drawings of which:

Figure 1:
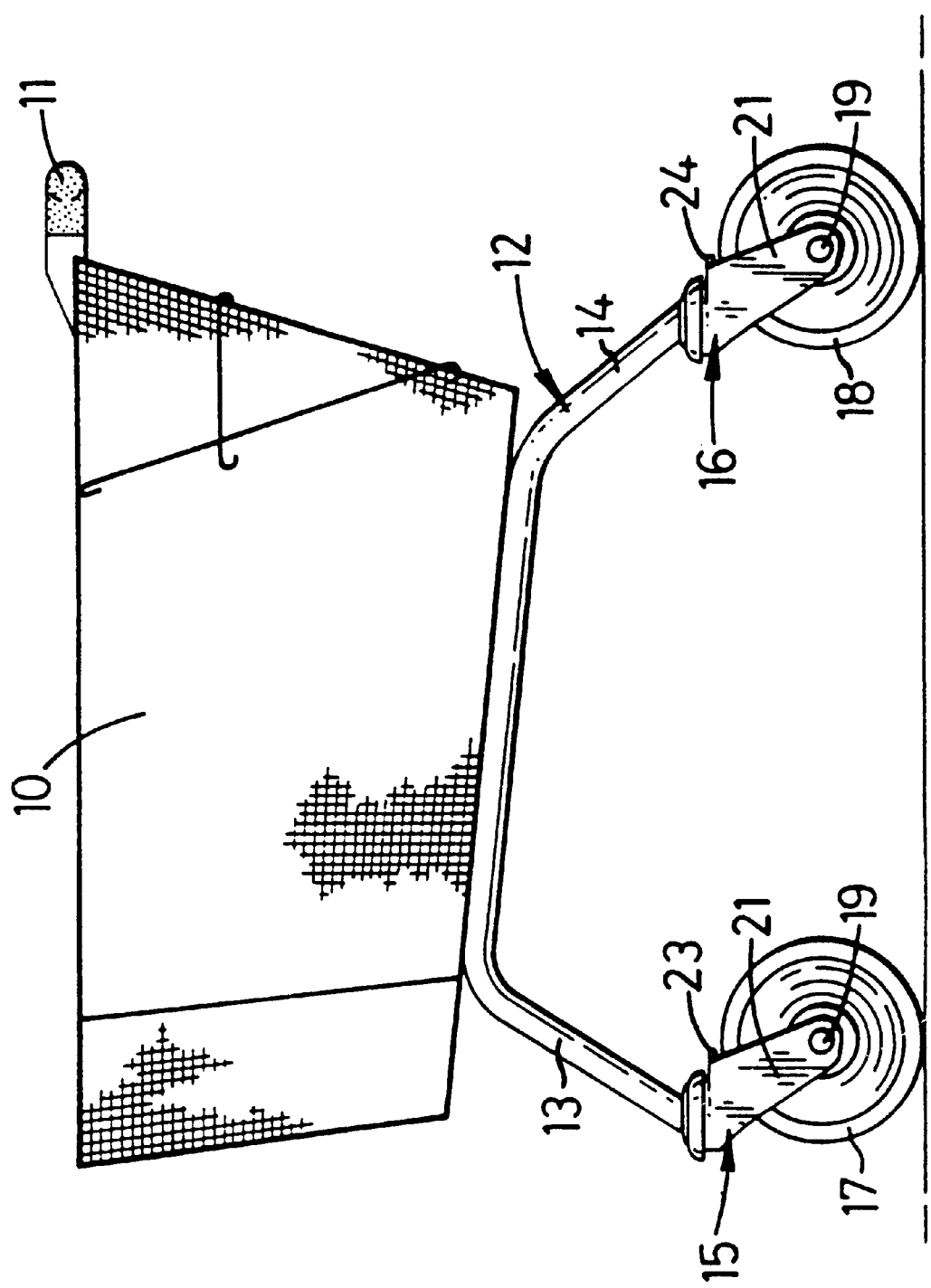
FIG. 1 is a side view of the shopping trolley.

FIG. 1 shows a shopping trolley which comprises a basket 10 having a handle 11 at its rear and supported on a carriage 12 which comprises a pair of front legs 13 and a pair of rear legs 14 which each has a respective castor 15,16 at its foot. Only one front leg 13 and one rear leg 14 can be seen in FIG. 1. Each of the castors 15 and 16 shown in FIG. 1 is of the type which comprises a single wheel 17,18 which is journalled on a respective axle 19 which is mounted at either end of the respective limb 21,22 of a fork 23,24. The castors 15 and 16 are shown in FIG. 1 with their wheels 17,18 trailing and substantially in line, that is to say substantially parallel to the longitudinally-extending vertical plane of symmetry of the trolley.

Figure 2:
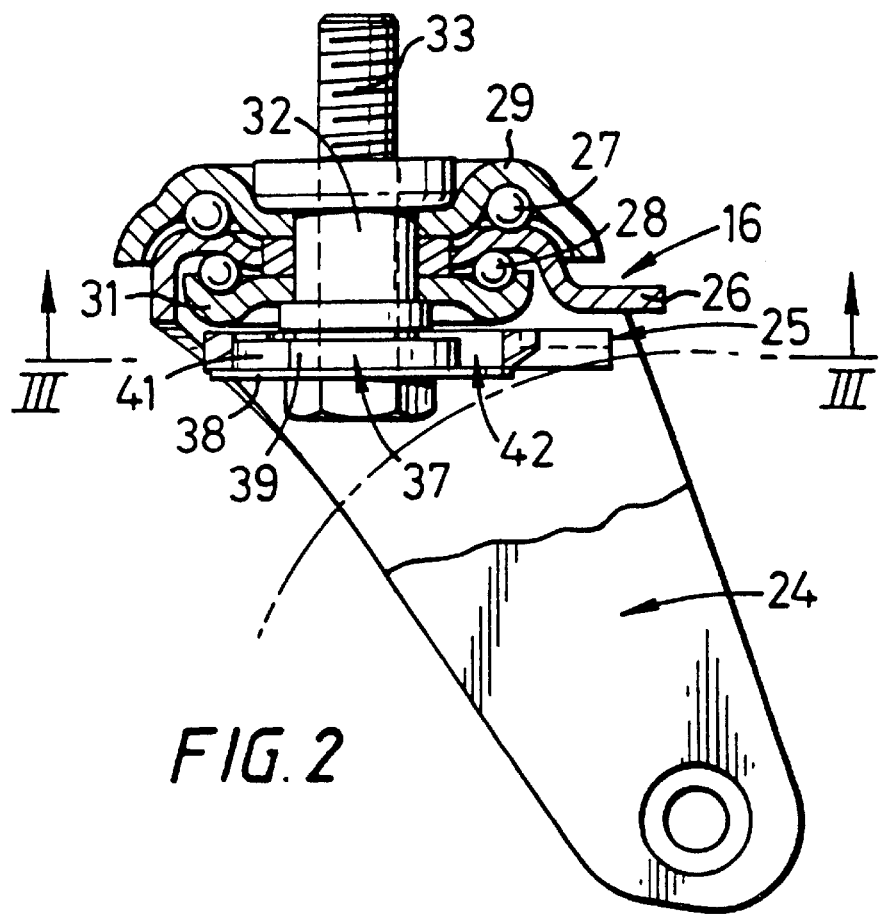
FIG. 2 is a partly-sectioned side view of an exemplary castor of the fork type fitted with an aid to steering.

FIG. 2 shows a rear castor 16 to which a steering assistance device 25 of this invention is fitted. Each front castor 15 is similar but does not have a steering assistance device 25 fitted to it.

Each fork 23,24 has a bridge piece 26 (see FIG. 2) which is supported for swivelling movement between upper and lower circumferential arrays of ball bearings 27,28. Each array of ball bearings 27,28 has a respective upper or lower ball race 29,31. The ball races 29 and 31 are rivetted together by a central tubular rivet 32 through which a fixing bolt 33 is passed, the fixing bolt 33 being the means by which the respective castor 15,16 is mounted in the respective leg 13,14 of the trolley.

Figure 3:
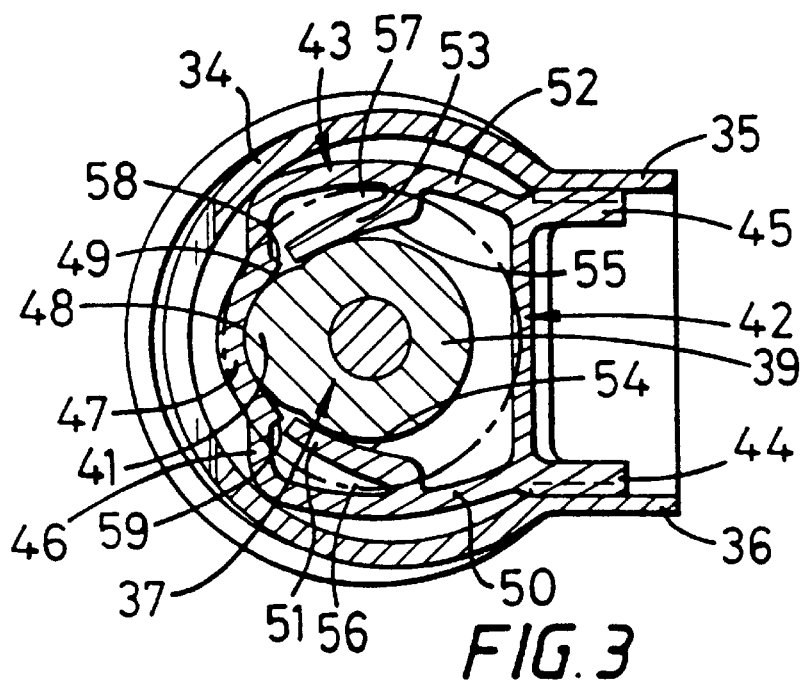
FIG. 3 is section on the line III—III of FIG. 2.

The bridge piece 26 has a depending skirt portion which is generally U-shaped in plan view, as can be seen in FIG. 3. The skirt portion comprises an arcuate portion 34 and a pair of end portions 35 and 36 which are substantially parallel. When the swivelling portion of each castor 15,16 is in line with its wheel 17,18 trailing, as shown in FIG. 1, the arcuate bridge piece portion 34 is at the front and the end portions 35 and 36 extend rearwardly.

FIGS. 2 and 3 show that the steering assistance device 25 comprises a single component 37 adapted to be captured by a capture device 42. The single component 37 comprises a disc portion 38 with an upstanding cam portion 39 formed integrally therewith. The component 37 is clamped to the underside of the tubular rivet 32 by the fixing bolt 33, with a lock washer between the cam portion 39 and the rivet 32, so that the head of the fixing bolt 33 is received in a recess formed on the side of the component 37 on which the disc portion 38 is formed. The cam portion 39 has a radially projecting lobe 41. Loosely supported on the disc portion 38 and surrounding the cam portion 39 is the capture device 42.

Each of the component 37 and the capture device 42 is a moulding of an engineering plastics material. The preferred plastics material is an acetyl material such as Delrin, which is marketed by Dupont, or Kemetal which is marketed by Hoechst.

FIG. 3 shows that the portion 43 of the capture device 42 which forms a closed figure around the cam portion 39 has two generally parallel end portions joined by two opposing inwardly concave side portions 50 and 52. The projecting side portions 44 and 45 are a sliding fit between the end portions 35 and 36 of the bridge piece of the fork 24. The end portions 35 and 36 of the bridgepiece provide lateral location for the capture device 42. Also there is clearance for the wheel 18 between the projecting side portions 44 and 45.

The end portion 46 of the closed portion 43 that is further from the projecting side portions 44 and 45 and which is adjacent to the arcuate bridge piece portion 34 of the fork 24, has a central arcuate portion 47 which presents a convex surface 46 of a recess 49 to the cam portion 39. The radius of curvature of the inner face of the convex surface 48 is substantially the same as that of the edge of the lobe 41 so that the latter is a snug fit in the arcuate recess 49.

Two projections 58 and 59 are formed adjacent to and one on either side of the recess 49. Each projection 58,59 projects into the closed portion 43, and away from the recess 49, and presents a convex surface to the cam portion 39. Each of the side portions 50 and 52 has an arm 51, 53 which extends into the closed portion 43 and towards the respective projection 58 and 59. Each arm 51,53 has an arcuate inner face which presents a convex surface 54,55 to the cam portion 39. Recesses 56 and 57 are defined by a respective one of the side portions 50 and 52, the end portion 46, the nearer of the projections 58 and 59 and the respective arm 51, 53. The arms 51 and 53 are formed so that they are each resiliently deflectable into the adjacent recess 56, 57.

The width of each side and end portion of the closed portion 43 is sufficiently thin and the plastics material from which the capture device 42 is moulded is such that the side and end portions that make up the closed portion 43 may bend resiliently when subjected to an appropriate bending load. Hence, each of the side and end portions is a resilient slat.

When the corners of the closed portion 43 at either end of the end portion 46 are touching the arcuate bridge piece portion 34 and the resilient material of the capture device 42 is in its natural relaxed condition, the centre of the convex surface 48 is spaced from the axis of the cam portion 39 by substantially the same distance as is the tip of the lobe 41 of the cam portion 39. Hence, the lobe 41 can be received within the recess 49. However, the radius of curvature of the convex surface 48 is less than the radial dimension of the cam portion 39 measured from the axis of the cam portion 39 to the tip of the lobe 41 so that angular displacement of the capture device 42 relative to the cam portion 39 in either direction will be resisted by the material of the closed portion 43 when the lobe 41 is received within the recess 49. This resistance provides steering assistance and a degree of steering control.

The capture device 42 may be displaced angularly relative to the cam portion 39 through 30° degrees from the dead-centre position shown in FIG. 3 when the centre of the lobe 41 is seated at the centre of the arcuate recess 49 until the lobe 41 reaches the edge of the arcuate recess 49. During such angular displacement of the capture device 42 which accompanies swivelling of the fork 24 relative to the trolley leg 14, the material of the end portion 46 is forced by the lobe 41 to bend so as to tend to straighten at the respective edge of the arcuate recess 49 as well as to bend about the nearer corner of the closed portion 43 which is in abutment with the arcuate bridge piece portion 34. Such bending of the part of the end portion 46 between that nearer corner and the recess 49 is accompanied by a corresponding bending of the adjacent side portion or slat of the closed portion 43 so that that side portion or slat will bend inwardly. Eventually the lobe 41 of the cam portion 39 will be released from the arcuate recess 49. The resistance to angular displacement of the capture device 42 provided by its material increases progressively to a maximum as it is displaced from the dead-centre position and until the lobe 41 is disengaged from the recess 49, as is shown diagrammatically in FIG. 4. The engagement or disengagement of the lobe 41 in the recess 49 will be barely perceptible and substantially effortless so that there will not be any need to provide instruction for use of the trolley.

Figure 4:
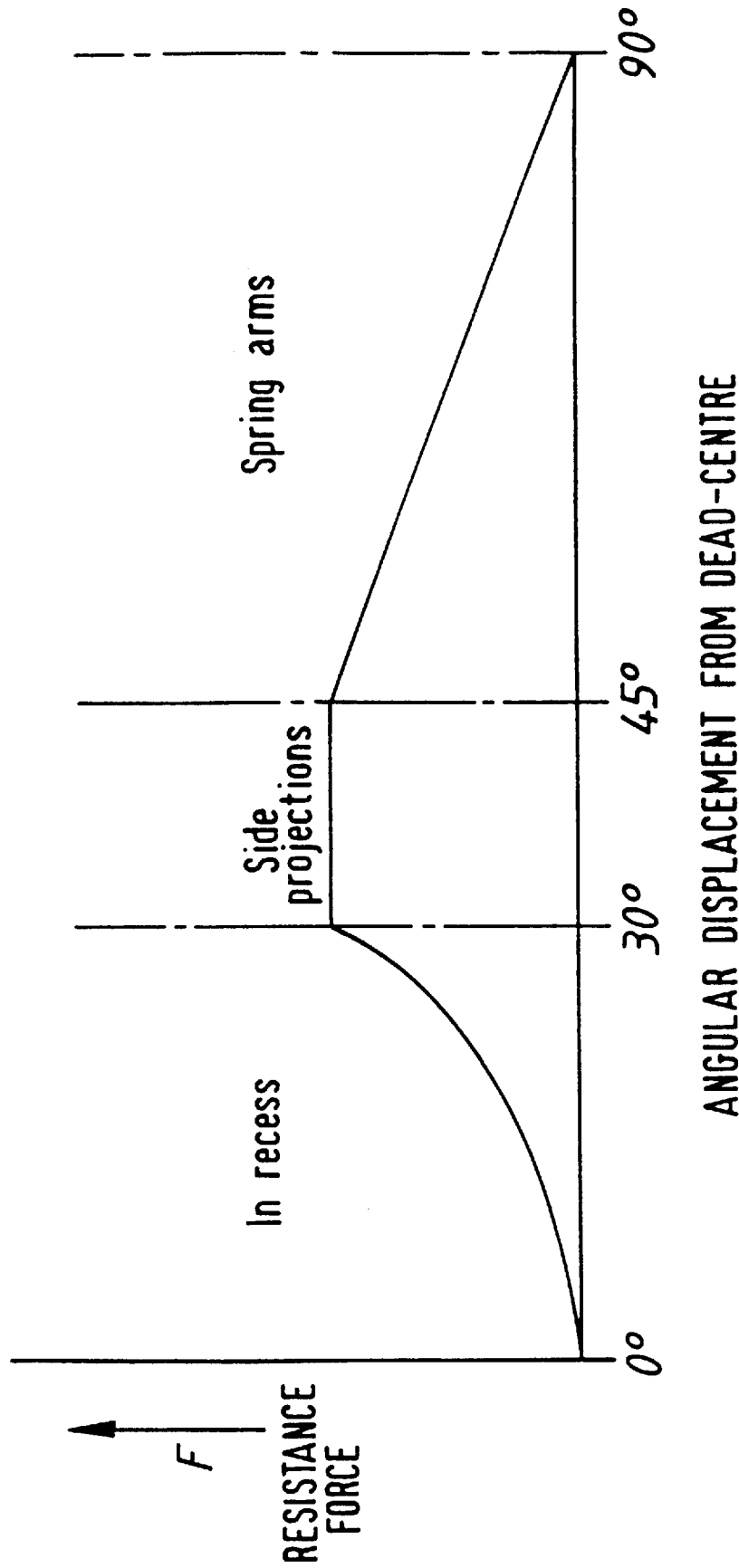
FIG. 4 is a diagram in graphical form of the force that opposes angular displacement of the swivel body of the castor shown in FIGS. 2 and 3 from the dead-centre position with such angular displacement.

The projections 58 and 59 at either end of the recess 49 are formed so that that maximum resistance to further angular displacement of the capture device 42 away from the recess 49 is maintained, as is illustrated diagrammatically in FIG. 4, and until the lobe 41 has been transferred through a further 15° into engagement with the respective one of the arms 51 and 53. This resistance provides a degree of steering control. The distance between every point on the arcuate inner faces of the arms 51 and 53 and the axis of the cam portion 39 is also less than the radial distance from the axis of the cam portion 39 to the tip of the lobe 41, so that when the lobe 41 is engaged with one of the arms 51 or 53, the angular movement of the capture device 42 is resisted by the flexing resilience of that arm 51 or 53. This resistance also provides a degree of steering control. Engagement of the lobe 41 with the one of the arms 51 or 53 on the capture device 42 causes that arm 51,53 to be resiliently deflected, the lobe 41 pushing the arm 51,53 with which it is engaged away from its natural position and into the adjacent recess 56,57. This deflection of the arm 51,53 resists the movement of the capture device 42 and thereby provides a degree of steering assistance. As the wheel is rotated further, the side portion 50,52 on which the arm 51,53 is formed, bends until eventually, after a further 45° of angular displacement, the lobe 41 disengages from the arm 51,53. FIG. 4 shows that the resistance to such further angular displacement of the capture device 42, offered by the arm 51, 53, reduces evenly over this range of angular displacement of 45°.

The closed portion 43 of the capture device 42 is restored to its natural relaxed condition and the swivelling body of the castor 16 is free for free swivelling relative to the cam portion 39 and the fixing bolt 33, when the lobe 41 has disengaged from the arm 51, 53 after having been displaced angularly through 90° from the dead-centre position, there being a friction-free clearance between the cam portion 39 and its lobe 41 on the one hand and the closed portion 43 of the capture device 42 on the other hand, through the 180° of swivelling movement between the two arms 51 and 53 in a clockwise direction as seen in FIG. 3.

Hence, in the embodiment shown in FIGS. 2 and 3, a first stage of steering assistance or control is provided when the lobe 41 of the cam portion 39 is engaged within the recess 49. That is for about 30 degrees of the possible range of 360 degrees of swivelling of the castor body and the resistance to such angular displacement provided by the capture device 42 increases progressively with the angular displacement. The capture device 42 may be arranged to provide a greater degree of steering assistance over perhaps as much as 60 degrees by suitably arranging the lobe of the cam and the recess of the capture device. A second stage of steering assistance is provided when the lobe 41 is being transferred from engagement with the recess 49 to engagement with one of the arms 51 and 53, the maximum resistance to such angular displacement being maintained. A third stage of steering assistance is provided when the lobe 41 is engaged with one of the arms 51,53 of the capture device 42, possibly in the range of 45° to 90° of the possible range of 360° for the castor, during which the resistance to such angular displacement is gradually reduced until the lobe 41 is released from engagement with the arms 51 and 53.

It is a simple matter to fit the steering assistance device 25 to a rear castor of a trolley. All that is required is for the castor to be removed from the trolley and for the wheel and the fixing bolt of the castor to be removed from the fork 23,24. The steering assistance device 25 is then offered up to the rivet 32 in the form of the stack that comprises the single component 37 and the lock washer with the capture device 42 supported on the disc portion 38 and surrounding the cam portion 39 and the single component 37, all supported on the head of the fixing bolt 33 as shown in FIG. 2. The castor would then be refitted to the trolley leg by tightening up the fixing bolt, whereafter the wheel would be refitted to the castor.

The lobe 41 of the cam portion 39 is engaged in the recess 49 of the capture device 42 and the fork held in the trailing position whilst the fixing bolt 33 is being tightened up. The fixing bolt 33 may be the one that was removed or another, longer one if needs be. Hence the steering assistance device 25 could be sold as a kit of parts to modify existing trolleys to provide them with an automatic steering control.

The steering assistance device 25 functions to provide steering assistance when the trolley is steered along a large radius or curved path (say at least 1.5 meters radially), the lobe 41 staying engaged within the recess 49. On the other hand the lobe 41 will quickly and automatically disengage from the recess 49 if the trolley is made to make a sharp turn or to move sideways, thereby causing the lobe 41 to be further displaced angularly and to engage with one of the arms, and possibly then, on further angular movement, to be released from that engagement for unrestricted swivelling through about 180 degrees.

The disc portion 38 of the single component 37 serves as a guard which protects the steering assistance device from debris, such as mud, which might be thrown up by the wheel. The gaps at its perimeter, which is shown chain dotted in FIG. 3, may be substantially closed by suitable flanges formed by moulding on the closed portion 43 of the capture device 42.

Figure 5:
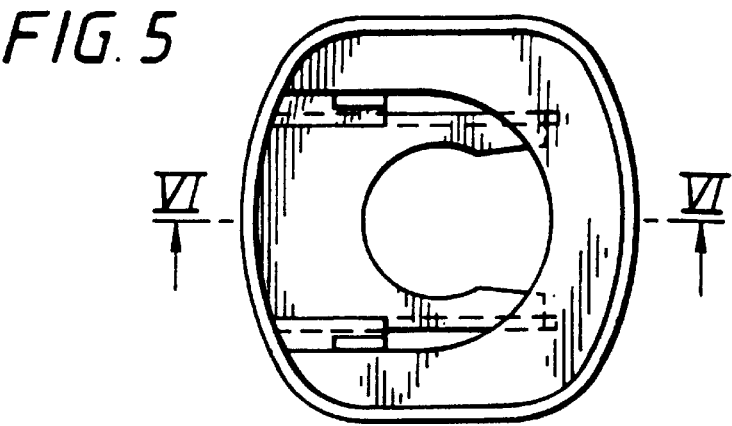
FIG. 5 is a plan view of part of a carrier device for fitting to another kind of exemplary castor.
Figure 6:
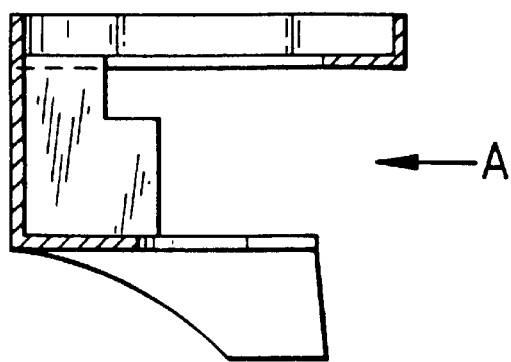
FIG. 6 is a section along the line VI—VI in FIG. 5.
Figure 7:
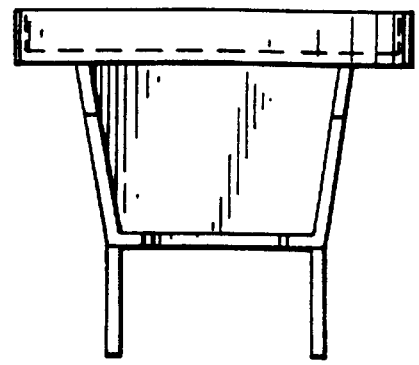
FIG. 7 is an end view of FIG. 6 as seen along arrow A.
Figure 8:
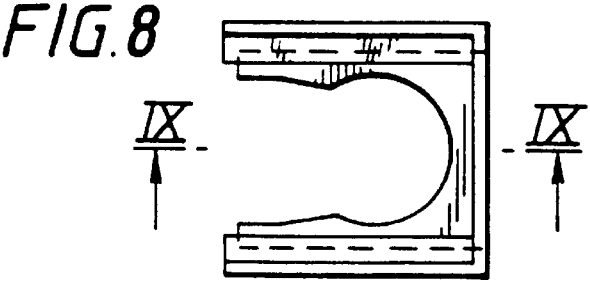
FIG. 8 is a plan view of another part of the carrier device of which one part is shown in FIGS. 5 to 7.
Figure 9:
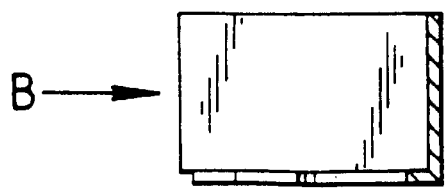
FIG. 9 is a section along the line XI—XI in FIG. 8.
Figure 10:
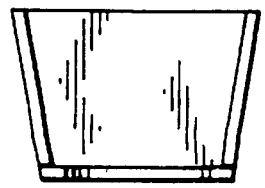
FIG. 10 is an end view of FIG. 9 as seen on arrow B.

A steering assistance device 25 in which this invention is embodied may be fitted to forms of castors other than the fork type described above with reference to FIGS. 2 and 3 of the drawings. FIGS. 5 to 10 show a two-part housing which can be snap-fitted onto a cylindrical boss formed in a central swivelling body of a two wheeled castor, the body being between the two wheels and the boss surrounding the fixing bolt by which the castor is fixed to the leg of the trolley. Each part has a key hole slot (see FIGS. 5 and 8) formed in a base portion which is to be snap-fitted onto the boss. The part shown in FIGS. 5 to 7 has a U-shaped tray portion above that base portion and within an upstanding continuous peripheral wall. The enclosure bounded by the continuous wall snugly accommodates a closed figure capture device which is similar to the closed figure portion 43 of the capture device 42 shown in FIG. 3 and which is supported on the tray. The capture device cooperates with a cam similar to the cam portion 39 shown in FIG. 3. The cam is fixed to the fixing bolt which extends through the key hole slots and the recess formed by the U-shaped tray. The first of the two parts shown in FIGS. 5 to 7 is fitted to the central swivelling body of the castor before the castor is tightened up to the trolley leg. The other part of the housing which is shown in FIGS. 8 to 10 is snap-fitted onto the first part to ensure correct location of the closed figure capture device. Operation of the steering assistance device illustrated in FIGS. 5 to 10 will be apparent from the foregoing description of that shown in FIGS. 2 and 3.

We claim:

1. A castor for a shopping trolley, comprising a swivel body, a fixing component by which the castor is to be fixed to the respective leg of the shopping trolley, and means operable to resist angular displacement of the swivel body relative to the fixed component from a substantially dead centre position, said means comprising a spring-loaded capture device which comprises means carried by the swivel body which define a capture recess and cam means mounted on the fixing component, said spring-loaded capture device being operable to capture the cam means in said capture recess in the substantially dead centre position, characterised in that the castor is for a rear wheel of the shopping trolley and said cam means comprise a cam having a lobe, the spring-loaded capture device being operable to capture the lobe in said recess in the substantially dead centre position, the spring loading being operable to allow engagement and disengagement of the lobe from the recess at either end of a limited range of angular movement which extends on either side of the dead centre position and to resist angular movement of the capture device relative to the cam whereby steering assistance and a degree of steering control is provided when the lobe is engaged within the recess, whereby a substantially friction-free clearance around the cam and its lobe is provided for a substantial part of the range of swivelling movement of the swivel body relative to the fixing component when said lobe is disengaged from said recess and the spring of the spring-loaded capture device is relaxed whereby the swivel body is freed to engage in swivelling movement relative to the fixing component with no more than minimal resistance for a substantial part of the full range of swivelling movement of the swivel body relative to the fixing component.

2. A castor according to claim 1, wherein the spring-loaded capture device comprises a closed generally rectangular figure which extends around the cam, each side of the closed generally rectangular figure comprising a resilient slat, a respective one of which has an arcuate portion which forms the recess, the spring loading of the capture device being provided by the resilience of the slats.

3. A castor according to claim 2, wherein the spring-loaded capture device is loosely supported on the swivel body when the lobe is captured in the recess.

4. A castor according to claim 3, wherein the spring-loaded capture device has locating projections which are a sliding fit between cooperating locating surfaces formed on the swivel body whereby the capture device is positioned to resist angular movement relative to the body.

5. A castor according to claim 1, wherein the spring-loaded capture device is provided with two resiliently deflectable side members formed one on either side of the recess, each of the side members being adapted such that the lobe of said cam can engage and disengage with the recess and side members, so that, when the lobe of said cam is so engaged with one of the side members, the angular movement of the capture device is resiliently resisted, the spring-loading being such that it is operable to allow engagement or disengagement of the lobe of said cam with the side member, the arrangement being such that the swivel body is free for substantially friction-free swivelling movement relative to the fixing component when the lobe of said cam is disengaged from both the recess and the side members.

6. A shopping trolley having front and rear wheels on castors, wherein the castor of at least one of the rear wheels comprises a castor according to claim 1, the cam and the spring-loaded capture device being fitted to the castor so that the lobe of said cam is engaged within the recess when each rear wheel is in a substantially dead centre position with respect to the body of the castor whereby the castor is oriented with the wheel aft of the fixing component.

7. A kit of parts for a castor for a shopping trolley comprising the spring-loaded capture device and the cam of a castor according to claim 1 for fitting to a castor of a shopping trolley.

* * * * *

UNITED STATES PATENT AND TRADEMARK OFFICE
CERTIFICATE OF CORRECTION

PATENT NO. : 5,943,735
DATED : AUG. 31, 1999
INVENTOR(S) : Phillip Stuart WALKER et al.

It is certified that error appears in the above-identified patent and that said Letters Patent is hereby corrected as shown below:

In column 3, line 44, please change "46" to --48--.

Signed and Sealed this

Twenty-third Day of May, 2000

Attest:

Q. TODD DICKINSON

*Attesting Officer*    *Director of Patents and Trademarks*